US012202415B2

(12) United States Patent
Harmon et al.

(10) Patent No.: US 12,202,415 B2
(45) Date of Patent: Jan. 21, 2025

(54) CARGO BED ACCESSORY MODULE RECEIVING SYSTEM AND METHOD OF MODIFYING A CARGO BED TO RECEIVE ACCESSORY MODULES

(71) Applicant: Ford Global Technologies, LLC, Dearborn, MI (US)

(72) Inventors: Michael John Harmon, Northville, MI (US); Jesse Rene Diephuis, West Bloomfield, MI (US); Hussain Z. Tajmahal, Detroit, MI (US); Leyna Hirsch, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 17/665,923

(22) Filed: Feb. 7, 2022

(65) Prior Publication Data

US 2023/0249632 A1 Aug. 10, 2023

(51) Int. Cl.
*B60R 11/04* (2006.01)
*B60K 1/04* (2019.01)
*B60R 9/06* (2006.01)
*B60R 11/06* (2006.01)
*B60R 16/04* (2006.01)
*B62D 33/023* (2006.01)

(52) U.S. Cl.
CPC .............. *B60R 11/06* (2013.01); *B60K 1/04* (2013.01); *B60R 9/06* (2013.01); *B60R 16/04* (2013.01); *B62D 33/023* (2013.01); *B60K 2001/0416* (2013.01)

(58) Field of Classification Search
CPC .. B60R 5/00; B60R 5/04; B60R 5/041; B60R 9/00; B60R 9/042; B60R 9/048; B60R 9/055; B60R 9/06; B60R 9/065; B60R 16/03; B60R 16/04; B60K 1/04; B60K 2001/0416; B60K 2001/0466; B60K 2001/0477; B60K 2001/0494
USPC ...... 296/39.1, 39.2, 37.1, 37.6; 224/400, 42, 224/403, 404, 281
See application file for complete search history.

(56) References Cited

U.S. PATENT DOCUMENTS

| 4,406,493 A | 9/1983 | Albrecht et al. |
| 4,543,798 A * | 10/1985 | Page .................. B60R 11/06 224/543 |
| 4,842,326 A | 6/1989 | DiVito |

(Continued)

FOREIGN PATENT DOCUMENTS

| JP | 2016145032 A * | 8/2016 | ............... B60K 1/04 |
| RU | 2642227 C2 | 1/2018 | |

OTHER PUBLICATIONS

Text JP2016145032 (Year: 2016).*

*Primary Examiner* — Dennis H Pedder
(74) *Attorney, Agent, or Firm* — Vichit Chea; Carlson, Gaskey & Olds, P.C.

(57) ABSTRACT

A vehicle accessory module receiving system includes a first adaptor securable adjacent a first side wall of a cargo bed; and a second adaptor securable adjacent a second side wall of the cargo bed, the first and second adaptors establishing opposing sides of an opening configured to receive a vehicle accessory module, the first and second adaptors configured to concurrently engage the vehicle accessory module when the vehicle accessory module is received within the opening.

15 Claims, 7 Drawing Sheets

(56) References Cited

U.S. PATENT DOCUMENTS

| | | | |
|---|---|---|---|
| 6,186,575 B1 * | 2/2001 | Fisher | B62D 47/003 296/37.6 |
| 6,523,877 B1 * | 2/2003 | Damian | B60R 9/00 224/404 |
| 6,712,418 B1 | 3/2004 | Lathers | |
| 7,922,238 B2 | 4/2011 | Ische | |
| 8,196,986 B2 | 6/2012 | Lorenzo et al. | |
| 9,604,677 B2 | 3/2017 | McKinney et al. | |
| 9,738,226 B2 * | 8/2017 | Kamada | B60R 5/047 |
| 10,207,757 B2 | 2/2019 | Scaringe | |
| 2008/0017426 A1 | 1/2008 | Walters et al. | |
| 2023/0173898 A1 * | 6/2023 | Dawson | B60R 16/033 296/100.06 |

* cited by examiner

CARGO BED ACCESSORY MODULE RECEIVING SYSTEM AND METHOD OF MODIFYING A CARGO BED TO RECEIVE ACCESSORY MODULES

TECHNICAL FIELD

This disclosure relates generally to accommodating vehicle accessory modules within a cargo bed of a vehicle and, more particularly, to adaptors that provide a relatively standardized interface to accommodate the accessory modules.

BACKGROUND

Some vehicles, such as pickup trucks, include cargo beds. Sizes and shapes of the cargo beds vary depending on vehicle type. Users utilize cargo beds to carry various types of cargo.

SUMMARY

In some aspects, the techniques described herein relate to a vehicle accessory module receiving system, including: a first adaptor securable adjacent a first side wall of a cargo bed; and a second adaptor securable adjacent a second side wall of the cargo bed, the first and second adaptors establishing opposing sides of an opening configured to receive a vehicle accessory module, the first and second adaptors configured to concurrently engage the vehicle accessory module when the vehicle accessory module is received within the opening.

In some aspects, the techniques described herein relate to a vehicle accessory module receiving system, wherein the first adaptor includes a first wheel well recess to receive a wheel well of the first side wall, wherein the second adaptor includes a second wheel well recess to receive a wheel well of the second side wall.

In some aspects, the techniques described herein relate to a vehicle accessory module receiving system, wherein a lower side of the first adaptor includes a first foot that is received within a first groove of a floor of the cargo bed, wherein a lower side of the second adaptor includes a second foot that is received within a second groove of the floor of the cargo bed.

In some aspects, the techniques described herein relate to a vehicle accessory module receiving system, wherein the first adaptor and the second adaptor are a polymer-based, fiber-reinforced material.

In some aspects, the techniques described herein relate to a vehicle accessory module receiving system, wherein the first adaptor is a driver side adaptor and the first side wall is on a driver side of the cargo bed, wherein the second adaptor is a passenger side adaptor and the second side wall is on a passenger side of the cargo bed.

In some aspects, the techniques described herein relate to a vehicle accessory module receiving system, wherein the vehicle accessory module engages the first adaptor and the second adaptor through a rail and slot system.

In some aspects, the techniques described herein relate to a vehicle accessory module receiving system, wherein the first adaptor includes a first adaptor slot that extends longitudinally and opens to a vertically upper side of the first adaptor, the first adaptor slot configured to receive a first rail on a driver side of the vehicle accessory module, wherein the second adaptor includes a second adaptor slot that extends longitudinally and opens to a vertically upper side of second adaptor, the second adaptor slot configured to receive a second rail on a passenger side of the vehicle accessory module.

In some aspects, the techniques described herein relate to a vehicle accessory module receiving system, wherein the first adaptor slot, the first rail, or both are tapered such that the first rail is pressed against the first adaptor as the vehicle accessory module is received within the opening.

In some aspects, the techniques described herein relate to a vehicle accessory module receiving system, wherein the rail and slot system includes at least one rail electrical contact that contacts at least one slot electrical contact to electrically couple the vehicle accessory module to the cargo bed.

In some aspects, the techniques described herein relate to a vehicle accessory module receiving system, wherein the rail and slot system includes slots and rails that are horizontally aligned.

In some aspects, the techniques described herein relate to a vehicle accessory module receiving system, wherein the first adaptor includes a cutout to provide access to a power panel in the first side wall of the cargo bed.

In some aspects, the techniques described herein relate to a vehicle accessory module receiving system, further including the vehicle accessory module as a traction battery.

In some aspects, the techniques described herein relate to a vehicle accessory module receiving system, further including a spacer within the cargo bed forward the vehicle accessory module, wherein opposing laterally facing sides of the spacer abut the first adaptor and the second adaptor respectively.

In some aspects, the techniques described herein relate to a method of modifying a cargo bed, including: securing a first adaptor adjacent to a first wall of a cargo bed of a vehicle; securing a second adaptor adjacent to a second wall of the cargo bed; positioning a vehicle accessory module within an opening between the first adaptor and the second adaptor; and slidably engaging the vehicle accessory module with both the first adaptor and the second adaptor during the positioning.

In some aspects, the techniques described herein relate to a method, further including covering a wheel well of the first wall with the first adaptor and covering a wheel well of the second wall with the second adaptor.

In some aspects, the techniques described herein relate to a method, further including powering the vehicle accessory module using the vehicle.

In some aspects, the techniques described herein relate to a method, further including electrically coupling the vehicle accessory module to the vehicle using a rail electrical contact that directly contacts a slot electrical contact when the vehicle accessory module is engages with first adaptor and the second adaptor.

In some aspects, the techniques described herein relate to a method, wherein the vehicle accessory module includes a rail having the rail electrical contact and the first adaptor includes a slot having the slot electrical contact.

In some aspects, the techniques described herein relate to a method, further including slidably engaging by moving the vehicle accessory module vertically downward to slide rails into corresponding grooves within the first adaptor and the second adaptor.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details adaptors that can be used to modify a cargo bed of a vehicle so that the cargo bed can interface with vehicle accessory modules, such as a battery module, a storage module, or a tool module.

The adaptors allow vehicles having different sized cargo beds to accommodate the same vehicle accessory modules. The geometry of the adaptors can vary based on a size and geometry of the cargo bed. The adaptors reconfigure the cargo bed to provide a relatively standardized opening to receive a vehicle accessory module. The variability of the cargo beds is adjusted for by the adaptors. Thus, developing a specific vehicle accessory module for each cargo bed size is not required.

With reference to FIGS. 1-4, a vehicle 10, here a pickup truck, includes a cargo bed 14. The vehicle 10 can transport cargo within the cargo bed 14.

The vehicle 10 includes a first side wall 18D on a driver side and a second side wall 18P on a passenger side. The first side wall 18D and the second side wall 18P establish the opposing outboard sides of the cargo bed 14. The vehicle 10 includes a cab back 22 establishing a forward side of the cargo bed 14. The vehicle includes a tailgate 22 that can be moved pivoted back and forth between a closed position shown in FIG. 1 and an open position shown in FIG. 2. The tailgate 22 establishes an aft side of the cargo bed 14 when the tailgate 22 is in the closed position. The cargo bed 14 has a floor 26 that establishes a lower boundary of the cargo bed 14.

Figures 4A, 4B, 4C:
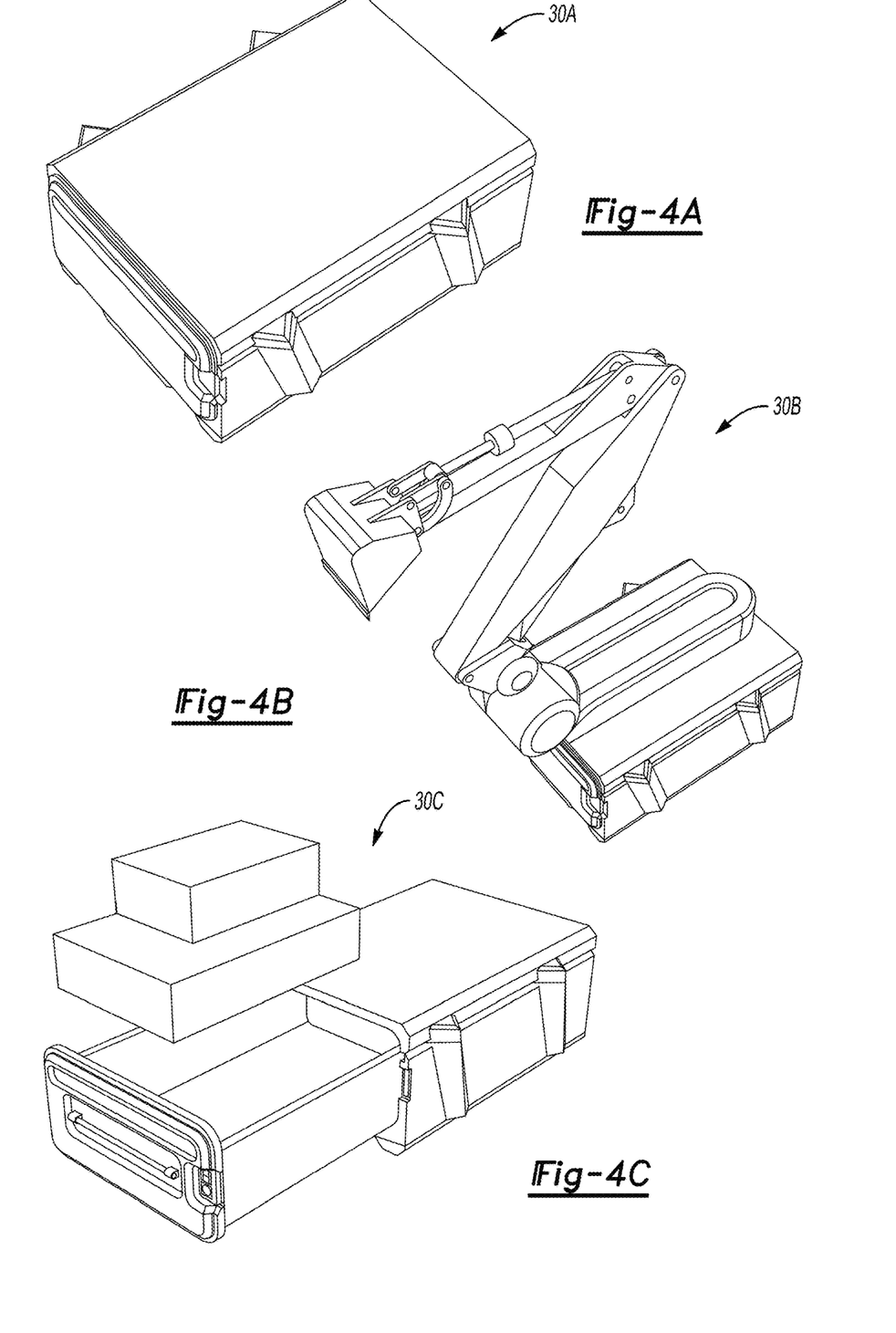
FIGS. 4A-4C illustrate exemplary vehicle accessory modules.

A user can wish to use a vehicle accessory module 30 with the vehicle 10. Other example types of the vehicle accessory module 30 can include a battery module 30A, an excavator module 30B, and a storage module 30C. Other example vehicle accessory modules can include a rapid supply chain module, a programmable robotic arm module, a material (e.g., salt or sand) spreader, a utility box module, and Computer Numeric Control (CNC) module, and a refrigeration or freezer module.

In this example, the vehicle accessory module 30 has interfacing areas 34 that interface with the vehicle 10. The interfacing areas 34 for each type of vehicle accessory module 30 can be standardized and can have a similar size and shape. This enables the user to, for example, switch the battery module 30A with the excavator module 30B.

Figure 1:
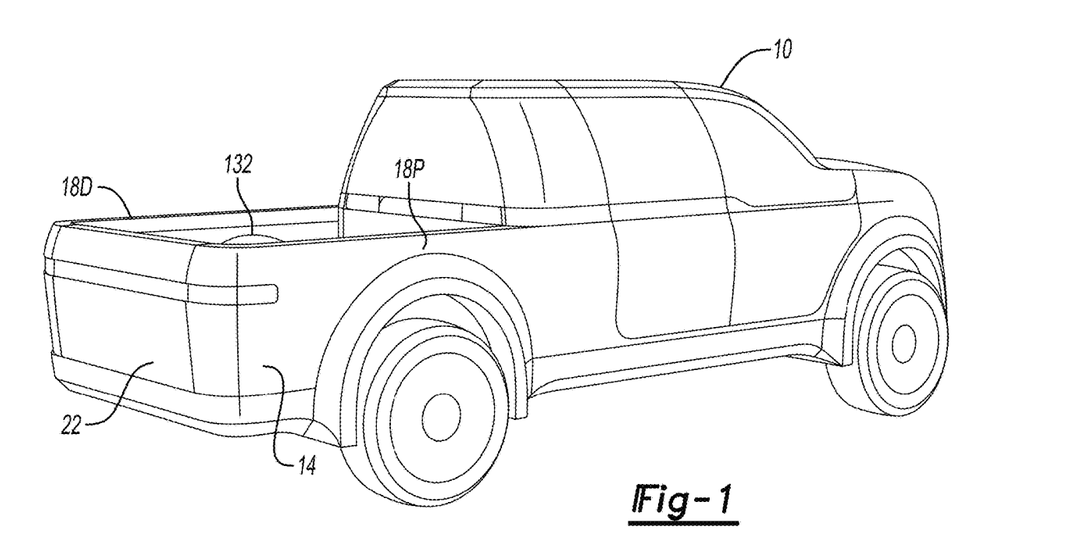
FIG. 1 illustrates a perspective view of a vehicle having a cargo bed according to an exemplary embodiment of the present disclosure.
Figure 2:
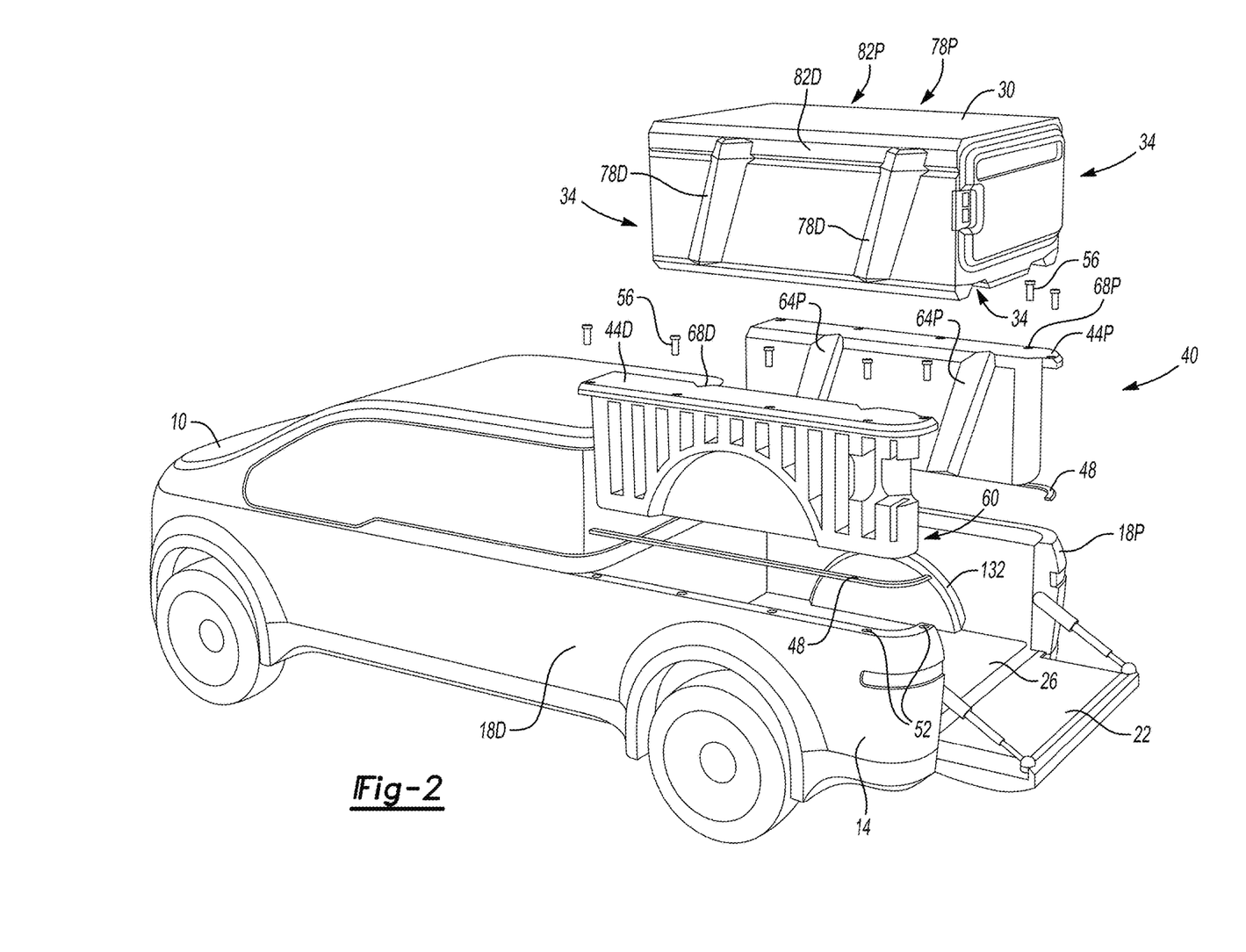
FIG. 2 illustrates an accessory module receiving system moving to a secured position with the vehicle to modify the cargo bed to receive a vehicle accessory module.

An accessory module receiving system 40 is used to modify the cargo bed 14 of the vehicle 10 to receive the vehicle accessory module 30. The system 40 includes, in this example, a first adaptor 44D and a second adaptor 44P. The first adaptor 44D is securable adjacent to the first side wall 18D of the cargo bed 14. The second adaptor 44P is securable adjacent to the second side wall 18P of the cargo bed 14.

Securing the first adaptor 44D and the second adaptor 44P involves, in this example, removing pieces of trim 48 from the first side wall 18D and the second side wall 18P. This exposes threaded bores 52 opening to the upper surfaces of the first side wall 18D and the second side wall 18P. The first adaptor 44D and the second adaptor 44P are then moved into positions adjacent the first side wall 18D and the second side wall 18P, respectively. Fasteners 56, such as self-locking bolts, are then engaged with the threaded bores 52 to secure the first adaptor 44D and the second adaptor 44P.

Figure 3:
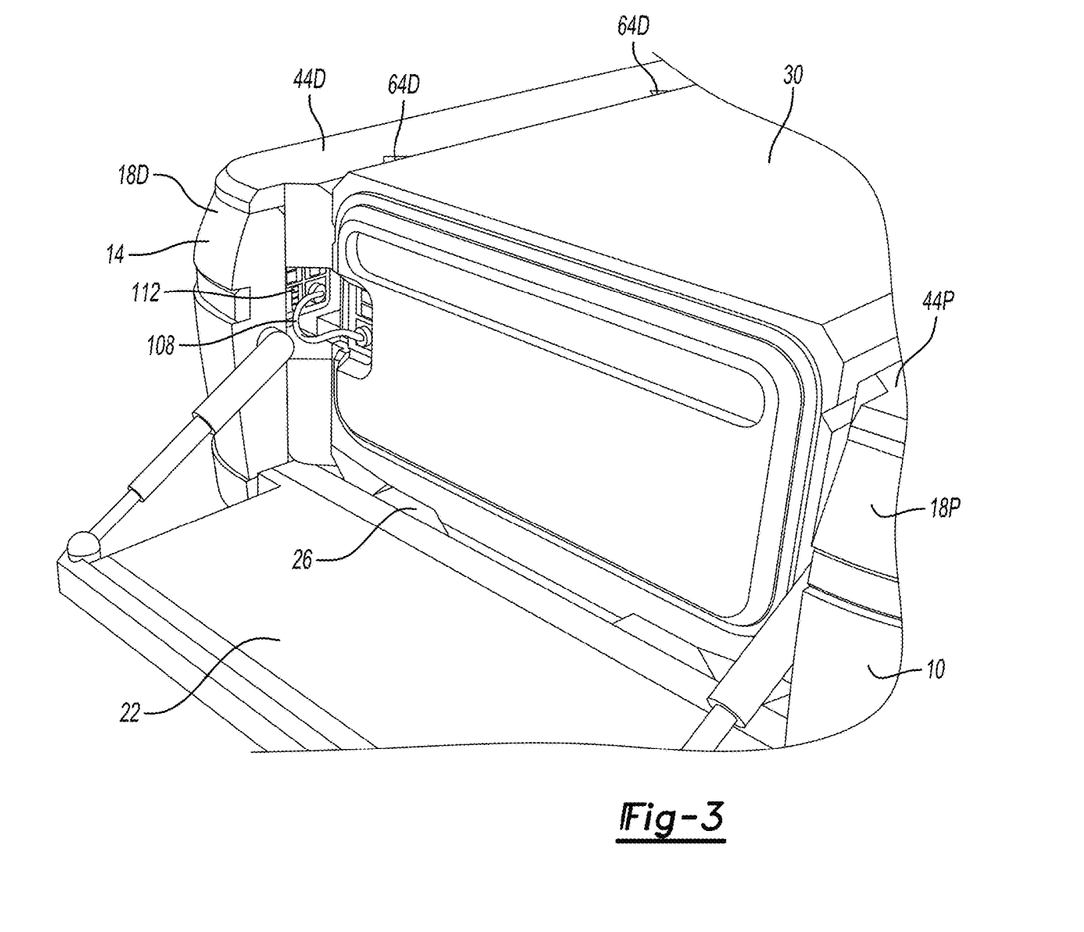
FIG. 3 illustrates a close-up view of the vehicle accessory module of FIG. 2 received within the cargo bed of the vehicle.

Once secured, the first adaptor 44D and the second adaptors 44P establish opposing sides of an opening 60 configured to receive the vehicle accessory module 30. In this example, the vehicle accessory module 30 can engage the first adaptor 44D and the second adaptors 44P through a rail and slot system as the vehicle accessory module 30 is received with the opening 60.

The rail and slot system, in this example, includes at least one adaptor slot 64D within the first adaptor 44D and at least one adaptor slot 64P within the second adaptor 44P. The adaptor slot 64D extends longitudinally and opens to a vertically upper side 68D of the first adaptor 44D.

The adaptor slot 64P extends longitudinally and opens to a vertically upper side 68P of the first adaptor 44P.

The vehicle accessory module 30 includes at least one first rail 78D that projects laterally outward from a first side 82D of the vehicle accessory module 30. The vehicle accessory module 30 includes at least one second rail 78P that projects laterally outward from an opposite, second side 82P of the vehicle accessory module 30.

The vehicle accessory module 30 can be moved vertically downward to slide the at least one first rail 78D and the at least one second rail 78P into respective adaptor slots 64D, 64P. As the vehicle accessory module 30 is received within the opening 60, the adaptor slots 64D and the adaptor slots 64P receive first rails 78D and second rails 78P respectively. The vehicle accessory module 30 is thus concurrently slidably engaged with first adaptor 44D and second adaptor 44P.

In an example, the adaptor slots 64D, the first rails 78D, or both could be tapered such that that the rails 78D press against the first adaptor 44D as the vehicle accessory module 30 is received within the opening 60. The adaptor slots 64P, the second rails 78P, or both could also be tapered such that the rails 78P press against the second adaptor 44P as the vehicle accessory module 30 is received within the opening 60. The tapering can help to located or center the vehicle accessory module 30 during loading.

Figure 5A:
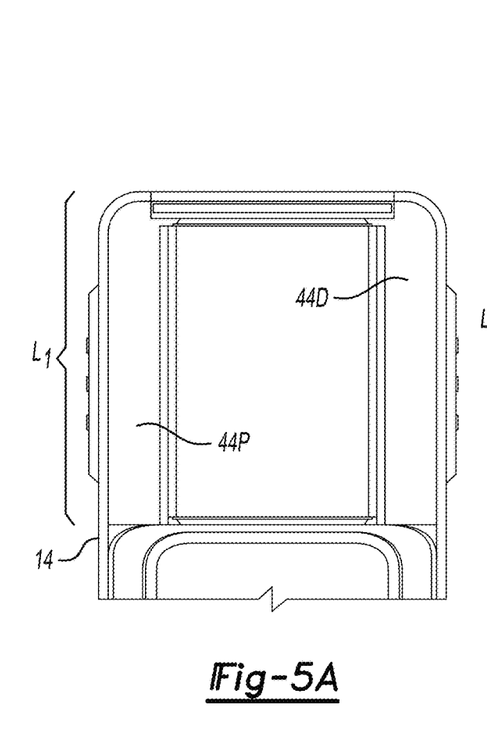
FIGS. 5A-5C illustrate the cargo bed of FIG. 1 along with other example cargo beds.
Figure 5B:
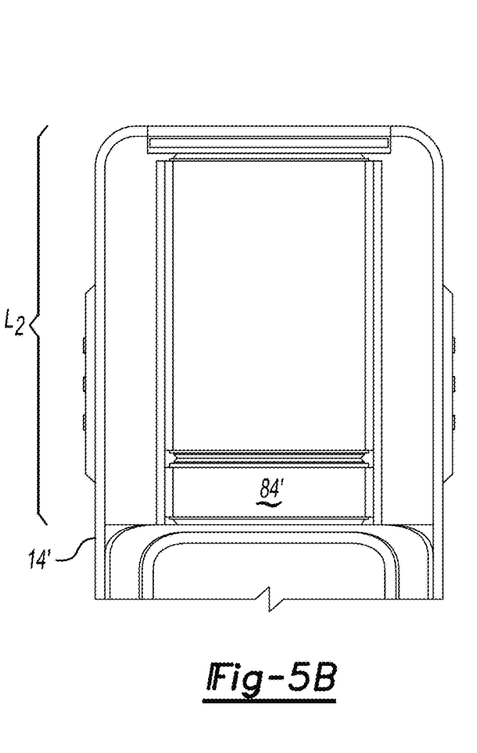
Figure 5C:
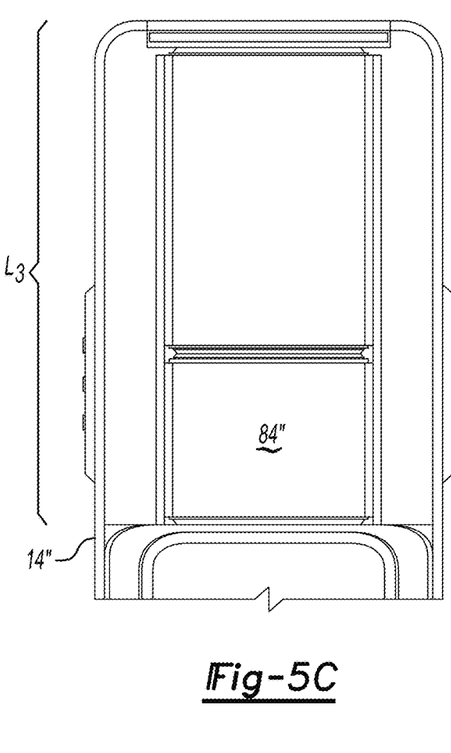

With reference to FIGS. 5A-5C, the vehicle accessory module 30 can be used within the cargo bed 14 having a length $L_1$, a cargo bed 14' having a length $L_2$, or a cargo bed 14" having a length $L_3$. The adaptors 44D, 44P can be designed for each of the cargo beds 14, 14', 14" so that the opening 60 remains similarly sized.

In the longer cargo beds 14', 14" a spacer 84', 84" can be added to fill an opening area in front of the vehicle accessory module 30. The spacers 84', 84" can provider a storage location for tools, for example. The spacer 84', 84" can extend from the adaptor on the driver side to the adaptor on the driver side.

Figure 6:
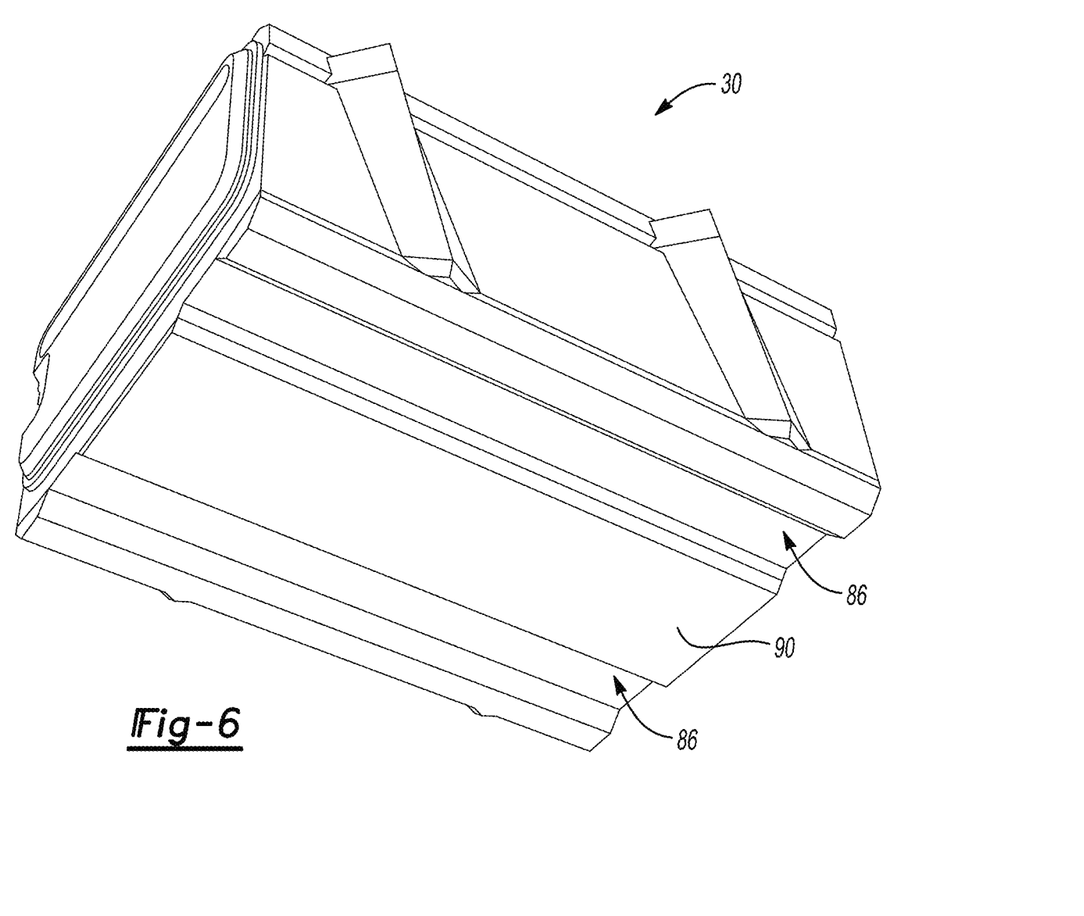
FIG. 6 illustrates an underneath view of the vehicle accessory module of FIGS. 2 and 3.

With reference to FIG. 6, the vehicle accessory module 30 can include load slots 86 on a bottom side 90. The load slots 86 can be used by a fork truck to help move the vehicle accessory module 30 into the engaged position within the opening 60.

Figure 7:
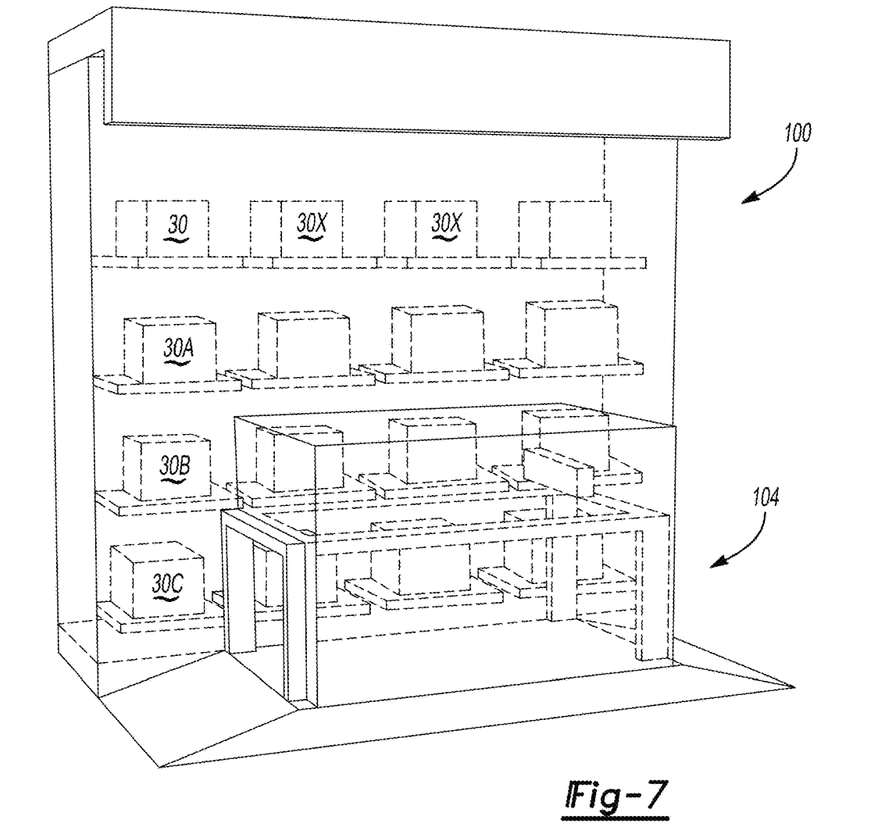
FIG. 7 illustrates a vehicle accessory module vending machine with vehicle accessory modules shown schematically.

The vehicle accessory module 30 could be moved into the vehicle 30 in other ways. With reference now to FIGS. 7 and 2, the vehicle accessory modules 30, 30A, 30B, 30C, along with other vehicle accessory modules 30X could be held within an accessory module vending machine 100. The vehicle 10 can be driven into a loading bay 104 of the machine 100 and request that the vehicle accessory module 30 within the machine 100 be loaded into the vehicle 10. The request could be made using a mobile device or through a touch screen interface within the vehicle 10, for example.

In response to the request, a delivery system of the machine 100 moves the accessory module 30 into the cargo bed 14 of the vehicle 10. The vehicle 10 can then be driven out of the loading bay 104.

Figure 8:
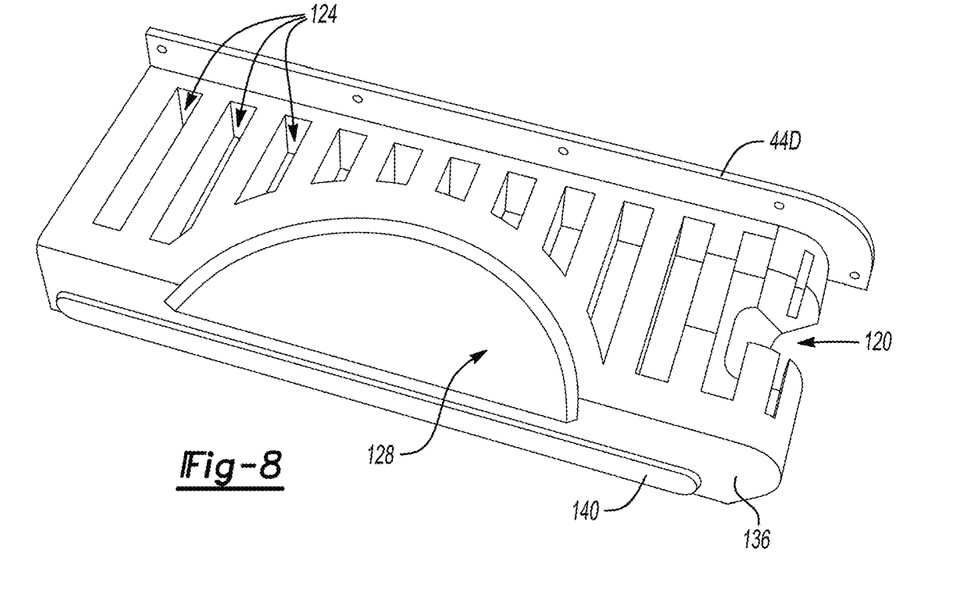
FIG. 8 illustrates a perspective view of an adaptor from the accessory module receiving system of FIG. 2.

Referring now to FIGS. 8 and 3, the vehicle accessory module 30 can be powered by the vehicle 10 when the vehicle accessory module 30 is received within the opening 60. In this example, the vehicle accessory module 30 electrically couples to the vehicle 10 using an electrical connector 108 that electrically connects the vehicle accessory module 30 to a power panel 112 of within the first side wall 18D.

Powering the vehicle accessory module 30 can be useful to power, for example, tools or refrigeration elements. In some examples, such as when the battery module 30A is used, the battery module 30A can provide power to the vehicle 10. The vehicle 10 is an electric vehicle and can use the power from the battery module 30A to drive an electric machine or recharge a traction battery of the vehicle 10. The battery module 30A can be a traction battery pack that is supplemental to another traction battery pack, or the only traction battery pack of the vehicle 10.

The first adaptor 44D includes a recessed area 120 that provide clearance to access the power panel 112 with the electrical connector 108.

The first adaptor 44D and the second adaptor 44P can be polymer-based, fiber-reinforced material. Cutouts 124 can reduce weight while still providing sufficient structural rigidity.

The first adaptor 44D and the second adaptor 44P are each formed to include a wheel well recess 128 to receive a wheel well 132 of the respective first side wall 18D or second side wall 18P. When the first adaptor 44D and the second adaptor 44P are secured within the cargo bed 14, The wheel wells 132 of the first side wall 18D and the second side wall 18P are completely covered. Thus, no portion of the wheel wells 132 extends into the opening 60. In some examples, the first adaptor 44D and the second adaptor 44P act as a heat sink.

The first adaptor 44D had a lower side 136 configured to interface directly with the floor 26. In this example, a foot 140 extends from the lower side 136. The foot 140 is provides a toe-in feature that is received within a groove of the floor 26 to help align the first adaptor 44D to the cargo bed 14. The second adaptor 44P includes a similar foot that is received within another groove of the floor 26.

Figure 9:
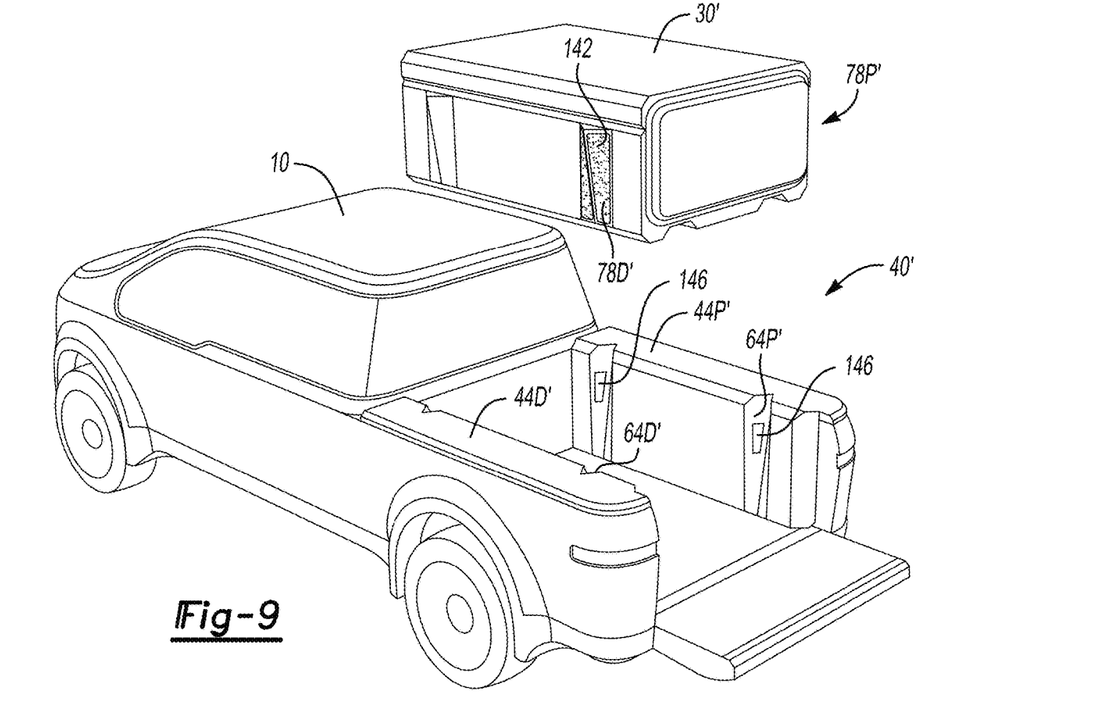
FIG. 9 illustrates an accessory module receiving system and a vehicle accessory module according to another exemplary aspect of the present disclosure.

With reference now to FIG. 9, another example accessory module receiving system 40' can include adaptors 44D', 44P' having adaptor slots 64', 64' that receive respective rails 78D', 78P' extending vertically, rather than vertically and horizontally from the vehicle accessory module'.

Figure 10:
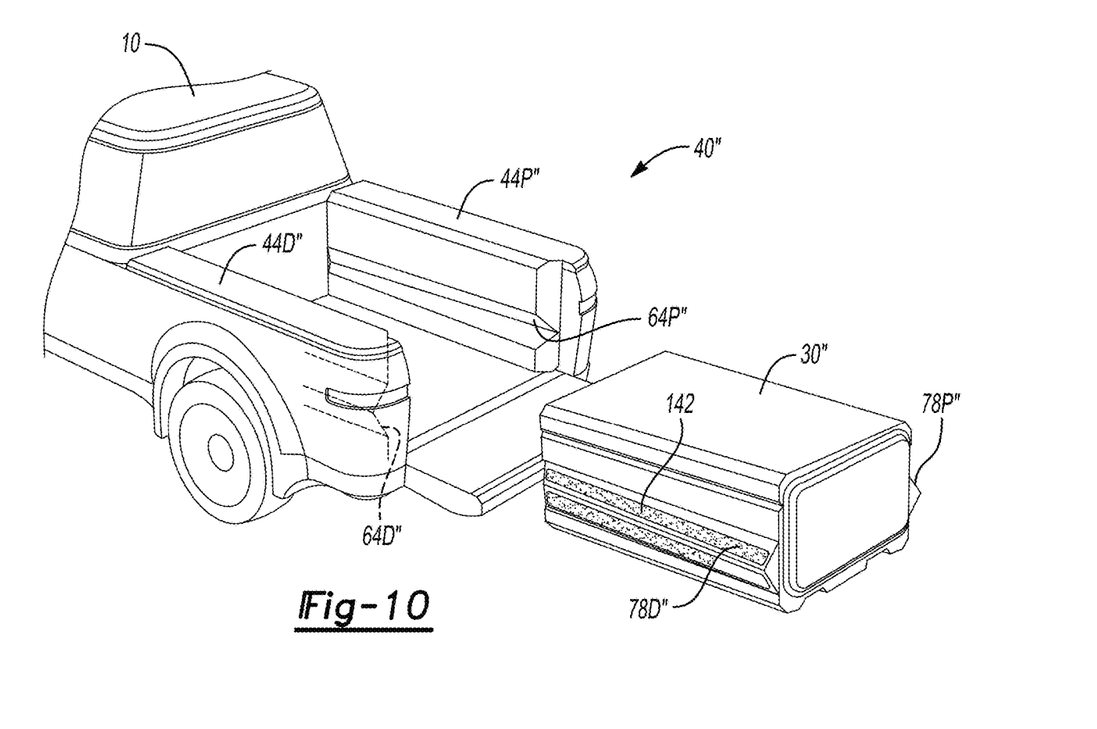
FIG. 10 illustrates an accessory module receiving system and a vehicle accessory module according to another exemplary aspect of the present disclosure.

As shown in FIG. 10, yet another accessory module receiving system 40" could include adaptors 44D", 44P" having engagement slots 64D", 64P" that receive rails 78D", 78P" extending horizontally from the vehicle accessory module 30".

The example rails 78D', 78D" include rail electrical contacts 142. When the rails 78D', 78D" and engaged within the respective slots 64D', 64D" the rail electrical contacts 142 directly contact slot electrical contacts 146 to electrically connect the respective vehicle accessory module 30', 30" to the vehicle 10. The rail electrical contacts 142 directly contact the slot electrical contacts 146 when the respective module 30', 30" is engaged.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle accessory module receiving system, comprising:
    a first adaptor securable adjacent a first side wall of a cargo bed; and
    a second adaptor securable adjacent a second side wall of the cargo bed, the first and second adaptors establishing opposing sides of an opening configured to receive a vehicle accessory module, the first and second adaptors configured to concurrently engage the vehicle accessory module when the vehicle accessory module is received within the opening, wherein the first adaptor includes a first wheel well recess to receive a wheel well of the first side wall, wherein the second adaptor includes a second wheel well recess to receive a wheel well of the second side wall,
    wherein the vehicle accessory module engages the first adaptor and the second adaptor through a rail and slot system,
    wherein the rail and slot system includes at least one rail electrical contact that contacts at least one slot electrical contact to electrically couple the vehicle accessory module to the cargo bed.

2. The vehicle accessory module receiving system of claim 1, wherein a lower side of the first adaptor includes a first foot that is received within a first groove of a floor of the cargo bed, wherein a lower side of the second adaptor includes a second foot that is received within a second groove of the floor of the cargo bed.

3. The vehicle accessory module receiving system of claim 1, wherein the first adaptor and the second adaptor are a polymer-based, fiber-reinforced material.

4. The vehicle accessory module receiving system of claim 1, wherein the first adaptor is a driver side adaptor and the first side wall is on a driver side of the cargo bed, wherein the second adaptor is a passenger side adaptor and the second side wall is on a passenger side of the cargo bed.

5. The vehicle accessory module receiving system of claim 1,
wherein the first adaptor includes a first adaptor slot that extends longitudinally and opens to a vertically upper side of the first adaptor, the first adaptor slot configured to receive a first rail on a driver side of the vehicle accessory module,
wherein the second adaptor includes a second adaptor slot that extends longitudinally and opens to a vertically upper side of second adaptor, the second adaptor slot configured to receive a second rail on a passenger side of the vehicle accessory module.

6. The vehicle accessory module receiving system of claim 1, wherein the first adaptor slot, the first rail, or both are tapered such that the first rail is pressed against the first adaptor as the vehicle accessory module is received within the opening.

7. The vehicle accessory module receiving system of claim 1, wherein the rail and slot system includes slots and rails that are horizontally aligned.

8. The vehicle accessory module receiving system of claim 1, wherein the first adaptor includes a cutout to provide access to a power panel in the first side wall of the cargo bed.

9. A vehicle accessory module receiving system, comprising:
a first adaptor securable adjacent a first side wall of a cargo bed; and
a second adaptor securable adjacent a second side wall of the cargo bed, the first and second adaptors establishing opposing sides of an opening configured to receive a vehicle accessory module, the first and second adaptors configured to concurrently engage the vehicle accessory module when the vehicle accessory module is received within the opening, wherein the first adaptor includes a first wheel well recess to receive a wheel well of the first side wall, wherein the second adaptor includes a second wheel well recess to receive a wheel well of the second side wall, wherein the vehicle accessory module is a traction battery.

10. The vehicle accessory module receiving system of claim 1, further comprising a spacer within the cargo bed forward the vehicle accessory module, wherein opposing laterally facing sides of the spacer abut the first adaptor and the second adaptor respectively.

11. A method of modifying a cargo bed, comprising:
securing a first adaptor adjacent to a first wall of a cargo bed of a vehicle;
securing a second adaptor adjacent to a second wall of the cargo bed;
positioning a vehicle accessory module within an opening between the first adaptor and the second adaptor;
slidably engaging the vehicle accessory module with both the first adaptor and the second adaptor during the positioning; and
powering the vehicle accessory module using the vehicle.

12. The method of claim 11, further comprising covering a wheel well of the first wall with the first adaptor and covering a wheel well of the second wall with the second adaptor.

13. The method of claim 11, further comprising electrically coupling the vehicle accessory module to the vehicle using a rail electrical contact that directly contacts a slot electrical contact when the vehicle accessory module is engages with first adaptor and the second adaptor.

14. The method of claim 13, wherein the vehicle accessory module includes a rail having the rail electrical contact and the first adaptor includes a slot having the slot electrical contact.

15. The method of claim 11, further comprising slidably engaging by moving the vehicle accessory module vertically downward to slide rails into corresponding grooves within the first adaptor and the second adaptor.

* * * * *